(12) United States Patent
Schöning et al.

(10) Patent No.: US 9,600,519 B2
(45) Date of Patent: Mar. 21, 2017

(54) METHOD AND SYSTEM TO DETECT CHANGES TO GRAPHICAL USER INTERFACE SCREENSHOTS USED IN DOCUMENTATION

(71) Applicant: Software AG, Darmstadt (DE)

(72) Inventors: Harald Schöning, Dieburg (DE); Juliane Harbarth, Griesheim (DE)

(73) Assignee: Software AG, Darmstadt (DE)

( * ) Notice: Subject to any disclaimer, the term of this patent is extended or adjusted under 35 U.S.C. 154(b) by 678 days.

(21) Appl. No.: 14/090,077

(22) Filed: Nov. 26, 2013

(65) Prior Publication Data

US 2015/0149493 A1    May 28, 2015

(51) Int. Cl.
*G06F 17/30*        (2006.01)
(52) U.S. Cl.
CPC .............................. *G06F 17/30386* (2013.01)
(58) Field of Classification Search
None
See application file for complete search history.

(56) References Cited

U.S. PATENT DOCUMENTS

| | | |
|---|---|---|
| 8,516,442 B2 | 8/2013 | Grechanik et al. |
| 2008/0250394 A1 | 10/2008 | Jones et al. |
| 2014/0189576 A1* | 7/2014 | Carmi .................. G06F 3/0481 715/781 |

* cited by examiner

*Primary Examiner* — Syed Hasan
(74) *Attorney, Agent, or Firm* — Posz Law Group, PLC

(57) ABSTRACT

A computer system includes a processor. The processor is configured to provide a documented screenshot and a machine-executable indication of steps which generated the documented screenshot as contained in documentation. The processor also will execute the steps which generated the documented screenshot, to generate a current screenshot. The processor also will compare the documented screenshot as contained in the documentation to the current screenshot generated by executing the steps, to provide a determination whether the comparison shows differences between the documented screenshot and the current screenshot. A method according to the above will detect changes to a screenshot used in documentation. A non-transitory computer-readable medium can perform a method to detect changes to a screenshot used in documentation.

17 Claims, 6 Drawing Sheets

METHOD AND SYSTEM TO DETECT CHANGES TO GRAPHICAL USER INTERFACE SCREENSHOTS USED IN DOCUMENTATION

TECHNICAL FIELD

The technical field relates in general to documentation of a software component, and more specifically to graphical user interface (GUI) screenshots used in documentation.

BACKGROUND

A documentation of a software component typically contains lots of system screenshots both of the system documented and of other systems. Screenshots may be provided in total or only as clippings.

A graphical user interface (GUI) is the face of an application towards a customer. For this reason, GUIs receive a high attention by product managers who take care that a GUI always reflects the latest corporate identity guidelines and follows the most recent design guidelines and best practices. As a result, a GUI screen faces frequent changes ranging from minor modifications such as slight color adoptions to major revisions, for example to reflect a new company branding.

As a result, product documentation which contains screenshots requires frequent revision in order to check whether the system status documented thereby still accurately reflects the system's actual state. These revisions at least have to take place when releasing a new version of the product, but typically occur more often. The revision is applied to the complete documentation (including the textual parts), but checking the screenshots is usually the major part of this work, for example because for the reasons named above, the textual part often need not undergo any change when the color schemes etc. are changed, while all screen shots might be made incorrect or outdated by such a change.

Currently, releasing a new version of a product requires re-reading the documentation in order to make sure it is still accurate. This includes rewriting parts that are no longer up-to-date. Some parts of the documentation may get skipped by the revision process, because of the fact that no changes occurred to parts of the system described therein. This might be dangerous however since changes in one part of the product may change the functioning and/or appearance of other parts though they may seem unrelated.

This re-reading and adapting operation must always be undertaken by humans since machines cannot be expected to catch the meaning of human readable sentences and thus cannot judge whether these describe a system's behavior appropriately, let alone replace them with something more suitable if they are outdated.

While reading through the texts of the documentation and looking at the intermingled screenshots, the human reader also has to check whether these screenshots are still identically produced by the system by the same means they have been produced by previous versions of the software. To be sure about this, the reviser might feel inclined to reproduce the screenshot using the current version of the software. If the screenshots differ, the old one gets replaced. If the difference is purely cosmetically (that is, the screenshots show the same things revealing the same information as before), this replacement must not be accompanied by changes to the surrounding text. If the screenshots differ but the difference is not purely cosmetic, the changes in the screenshot might need to be accompanied by changes to the documentation text.

U.S. Pat. No. 8,516,442 discloses to attach metadata to GUI elements. It uses GUI metadata processing logic to address the technical challenges associated with managing potentially large amounts of informational data describing a GUI. In particular, applying/mapping metadata to other GUI elements is described using a mapping record stating relationships between GUI elements. U.S. Pat. No. 8,516,442 associates metadata to GUI elements, such as buttons and the like, but not screens. Just attaching metadata to screens does not help in updating screenshots in documentation.

SUMMARY

Accordingly, one or more embodiments provide a computer system which includes a processor. The processor is configured to provide a documented screenshot and a machine-executable indication of steps which generated the documented screenshot as contained in documentation. The processor also will execute the steps which generated the documented screenshot, to generate a current screenshot. The processor also will compare the documented screenshot as contained in the documentation to the current screenshot generated by executing the steps, to provide a determination whether the comparison shows differences between the documented screenshot and the current screenshot.

According to another embodiment, the documented screenshot and the current screenshot are compared using a bit-wise comparison of their images, and the comparison is determined to show differences when there are bit-wise differences in the images of the document screenshot and the current screenshot.

According to still another embodiment, the processor is further configured to determine whether the differences between the documented screenshot and the current screenshot are non-cosmetic, when the determination is that there are differences between the documented screenshot and the current screenshot; and to replace the documented screenshot as contained in the documentation with the current screenshot, when the differences are determined not to be non-cosmetic.

In yet another embodiment, the processor is further configured to provide a notification, when the determination is that there are differences between the documented screenshot and the current screenshot.

In still another embodiment, the machine-executable indication of steps which are provided by the processor and which are executed to generate the current screenshot includes:
  starting specifications that indicate a machine, a product and product version to install, and any data to load, for a system in which the processor is running;
  preparation steps which are applied to place the system in which the processor is running into a situation in which the screenshot is producible;
  graphical user interface (GUI) steps to indicate GUI interactions that produce an image on a display which will correspond to the documented screenshot, after the system is placed into the situation by the preparation steps; and
  GUI preparation steps to indicate steps to take and produce the current screenshot, which is appropriate for insertion into the documentation, from the image on the display after being produced by the GUI steps.

According to another embodiment, the processor is further configured to monitor and log the steps as they are taken, responsive to a command to initially generate the documented screenshot as contained in the documentation.

Still another embodiment includes an electronic storage cooperatively operable with the processor, and configured to store the documentation accompanied by the machine-executable indication of the steps which generated the documented screenshot as contained in the documentation.

One, or a combination of more than one, or all, of the above embodiments, can be combined and provided as a single embodiment.

Another embodiment provides a method according to the above that will detect changes to a screenshot used in documentation, according to one or more of these embodiments.

Yet another embodiment provides non-transitory computer-readable medium can perform a method according to one or more of these embodiments.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

Figure 1:
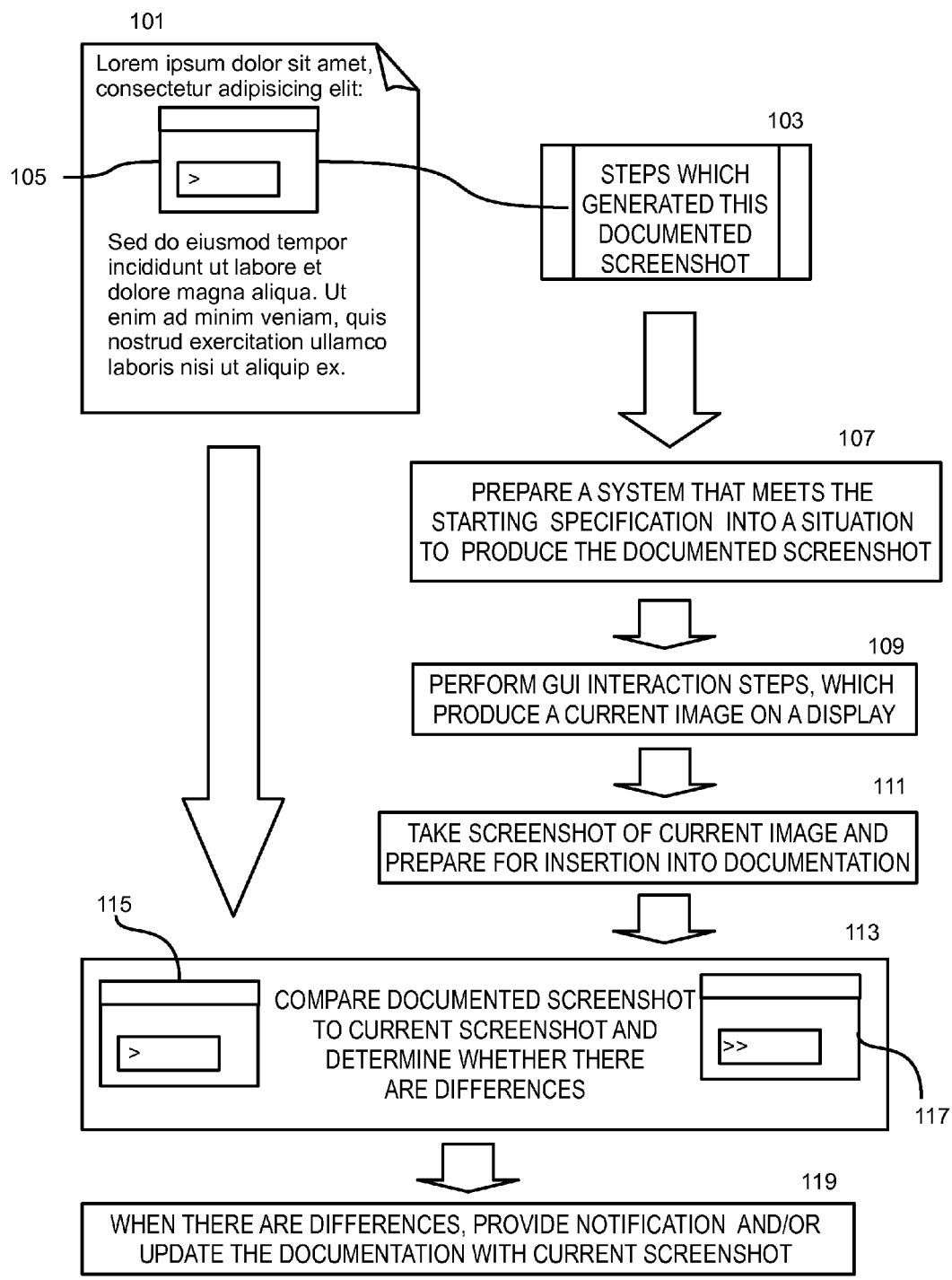
FIG. 1 is a data flow diagram for detecting a change to a graphical user interface (GUI) screenshot used in documentation.

In overview, the present disclosure concerns automatically checking and possibly correcting a documentation of a software component with respect to the system screenshots it exhibits. Such documentation frequently incorporates a discussion of a user interface portion of a software application; the documentation includes a reproduction of some or all of a graphical user interface (GUI), obtained as a screenshot (sometimes referred to as a screen dump, screen capture, or screen grab) which records the visible items displayed on a display device, typically to demonstrate to a reader of the documentation what a page looks like. Systems frequently include functionality to take a screenshot of an entire screen or of a selected portion of a screen, which can then be edited and incorporated into the documentation. A simple and efficient approach is disclosed in which the GUI screenshots incorporated into documentation can be checked to determine whether the GUI as documented has changed in the up-to-date system by reproducing the system, environment of the system, and the steps taken to record the GUI screenshot as documented, thereby to reproduce the same GUI screenshot, and then performing a comparison between the documented GUI screenshot and the current GUI screenshot. More particularly, various inventive concepts and principles are embodied in systems, devices, and methods therein to provide functionality supporting a machine executable description, associated with documentation, that enables production of an up-to-date counterpart of a screenshot which is included in the documentation.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

<Definitions>

The claims may use the following terms, which are defined to have the following meanings for the purpose of the claims herein. Other definitions may be specified in this document.

The term "computer system" or "computer" used herein denotes a device sometimes referred to as a computer, laptop, personal computer, personal digital assistant, notebook computer, personal assignment pad, server, client, mainframe computer, or evolutions and equivalents thereof; and to a computer-processor-enabled electronic device with electronic display which employs a graphical user interface to interact with a user.

The term "graphical user interface (GUI)" is used herein to denote a visual display provided by an electronic device that allows a user to interact with the electronic device through manipulation of graphical indications which are provided on the visual display and as a composite constitute the GUI; such graphical indications allow the user to interact with the electronic device and which are composited to collectively form the GUI include windows, menus, icons, buttons, pop-up menus, checkboxes, keyboards, and/or pointing devices.

<End of Definitions>

In overview, one or more embodiments can, among other things, provide a solution, which undoubtedly has value in the often forgotten area (and human intensive) of documentation checking, which not only saves time but reduces the errors that are frequently made due to the known phenomenon of "human blindness" when confronted by minor changes to a GUI that might be overlooked or might "appear" to be inconsequential.

As further discussed herein below, various inventive principles and combinations thereof are advantageously employed to efficiently facilitate detecting changes to graphical user interface screenshots which are used in documentation.

Further in accordance with exemplary embodiments, there is provided a tool that can automatically generate the GUIs used in documentation so that changes can be detected and can support a mechanism for simple decision rules to either allow a GUI to be replaced or draw the attention to changes for manual intervention. Documenters will tell you that it is an exhausting and sometimes menial task to update documentation when the majority has not been affected. This is also the source of many documentation errors due to the 'human blindness' effect. This system and method offers a semi-automated solution to tackle some of their problems and additionally detects possible areas where a change would be needed to the underlying text as a result of the change to a GUI that might have been overlooked.

Even though a revision of a software system's documentation overall may require human intervention, at least the screenshot revision can be partly automated. For this purpose a screenshot that occurs as part of the documentation, referred to herein as a "documented screenshot" can be accompanied with a machine executable description that enables the automated production of the screenshot's up-to-date counterpart, referred to herein as a "current screenshot." Having produced this counterpart, the two screenshots can automatically be compared. If there are changes, the screenshot can be automatically replaced by its more recent version.

Also a semi-automatic approach can be provided that would present a human with the two screenshots and inquire whether a replacement is ok. This can also enable the human to see whether the changes are merely cosmetic or whether a serious reconsidering of the whole documentation section is imminent.

This semi-automatic revision can either be interactive or it can be a batch job that judges by itself whether the changes are cosmetic and undertakes those changes, and just lists the more complex ones for further human processing.

Figure 2:
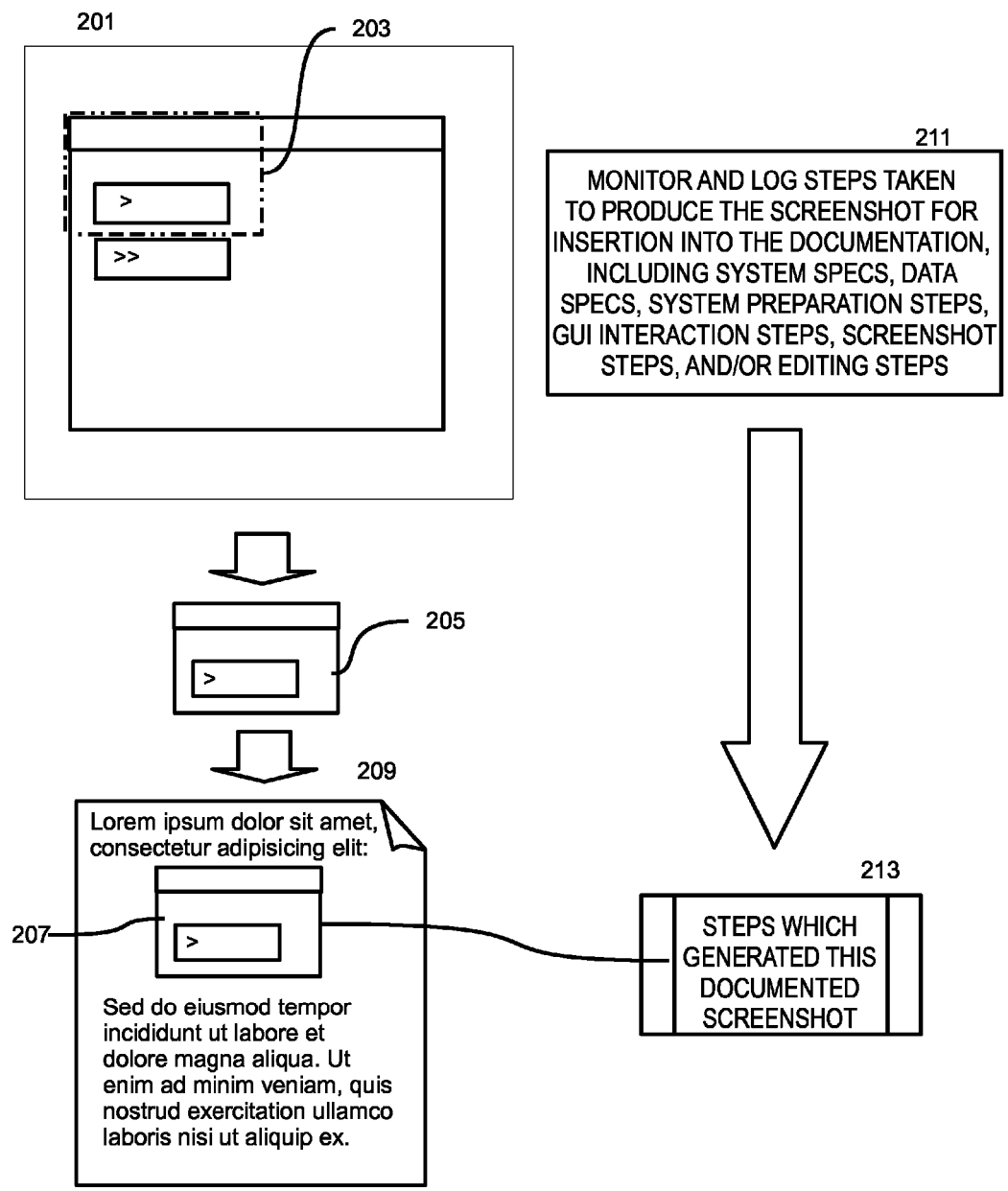
FIG. 2 is a data flow diagram for developing steps which generated a screenshot used in documentation.

FIG. 1 and FIG. 2 together provide an overview of data flows that automatically generate the GUIs used in documentation so that changes can be detected and supports a mechanism for simple decision rules to either allow a GUI to be replaced or draw the attention to changes for manual intervention. FIG. 1 relates to detecting that a GUI screenshot in the documentation has changed since the initial GUI screenshot (a "documented screenshot"), and FIG. 2 relates to preparing the documentation with the initial GUI screenshot so that a change can be detected.

Referring now to FIG. 1, a data flow diagram for detecting a change to a graphical user interface (GUI) screenshot used in documentation will be discussed and described. In this data flow, a documentation 101 includes a documented screenshot 105, plus other text as is typical. The documentation 101 can include many documented screenshots 105. Each of the documented screenshots 105 is associated with its own machine-executable indication of steps 103 which generated the documented screenshot. The machine-executable indication of steps 103 is retrieved, for example by being associated with the documented screenshot 105 in the documentation 101 (such as by a reference, pointer, index, or similar), or because the machine-executable indication of steps 103 is embedded in instructions to produce the documentation 101. The machine-executable indication of steps 103 can include, for example, a starting specification for setting up a system to produce the screen shot, preparation steps to place such a system into a situation in which the screenshot is producible, GUI interaction steps to put the image on a display, and/or GUI preparation steps to take the screenshot and prepare it for insertion into the documentation.

After retrieving the steps 103, a system is prepared 107 that meets the starting specification and is placed into the situation to produce the screenshot. Then, the system performs 109 GUI interaction steps, which produce a current image on a display. Then, the system takes 111 a screenshot of the current image and prepares the screenshot for insertion into documentation.

Now, the current screenshot 117 has been prepared, as defined by the steps 103, for insertion into the documentation, for example, by clipping, sizing, and so forth, in the same manner as the documented screenshot 105 was prepared. The documented screenshot 115 (which is the same as that 105 contained in the documentation 101), is compared 113 to the current screenshot 117 to determine whether there is any difference. Because screenshots typically result in bitmaps, this can conveniently be performed by a bit-wise compare. However, other known techniques can be used for a comparison. The comparison will result in identifying even minor differences which might be overlooked by a visual comparison. In the illustrated flow, the documented screenshot 115 and the current screenshot 117 have different prompts, which is a minor difference.

When there are differences, 119 a notification can be provided of the differences (or lack of differences), and/or the documentation can be updated to replace the documented screenshot 105 with the current screenshot 117 such as when the differences meet a definition as being cosmetic, and/or a user can be queried to provide a visual review and/or to correct related text in the documentation.

Referring now to FIG. 2, a data flow diagram for developing steps which generated a screenshot used in documentation will be discussed and described. In this dataflow, a screenshot 205 is being prepared for inclusion in a documentation 209. First, in response to user inputs, a screen 201 is displayed, and some or all of the screen 201 is selected for a screenshot 203, using known techniques, and then the screenshot 205 can be obtained in accordance with known techniques. The screenshot 205 can be edited if desired, and included as a documented screenshot 207 into the documentation 209, in accordance with known techniques.

Meanwhile, in parallel while a documenter is operating the GUI to produce the screen 201, screenshot 203, 205 and to include the documented screenshot 207 in the documentation 209, and/or in response to a user command, the system on which the user is working can monitor the steps for producing the screenshot. The system can monitor 211 and log the steps taken to produce the screenshot for insertion into the documentation, including one or more of the system specifications, data specifications, system preparation steps, GUI interaction steps, screenshot steps, and/or editing steps. Then, the machine-executable steps 213 which generated the documented screenshot can be associated with the documented screenshot 207 within the documentation 209. This can be repeated for each of screenshot included within the documentation 209. For example, for each documented screenshot 207, the documentation 209 can include an embedded description of the machine executable steps 213 which generated the documented screenshot 207, or a reference or pointer or index into separate storage which includes each indication of the steps 213 for each documented screenshot 207, which can be readily retrieved by accessing the documentation 209.

It should be noted that the present illustrations include a single page with a single documented screenshot. This is representative of a document of any size, with one or more documented screenshots.

Although documentation is typically presented to the users in a known format well-suited for displaying to a reader (such as PDF, HTML Help, XHTML, EPUB, etc.), documentation is typically defined so that it can be created in a structured way, from a documentation creation language, for example, a semantic markup language, for example based on XML schemas such as DocBook (see http://www.docbook.org/). Embodiments discussed herein are independent of a certain representation format. However, the following section describes a preferred implementation which assumes a user-facing PDF representation of the documentation which is generated in accordance with known techniques from an XML representation of the documentation. The XML source for the documentation can contain, for each picture that is a screenshot (or a part thereof), i.e., for each documented screenshot, an indication of machine-executable steps to take to produce the documented screenshot. The indication of the machine-executable steps can be an additional element <production> in the XML representation of the documentation that contains a description of how to reproduce the screenshot. This description can have sub-elements which can be conveniently conceptually divided into four sub-elements, which were alluded to above: <start>, <preparation-steps>, <gui-steps>, <gui-preparation>. Of course, the sub-elements as implemented, may have different designations. Each of these is discussed below The <start> sub-element can contain information about the basic situation that any subsequent steps are based upon.

A documentation describing a GUI component of CentraSite, a SOA Registry by Software AG, might contain for example a screenshot based upon CentraSite 8.2.2 installed with Active SOA license, no data loaded and no further modifications applied. For a machine-executable processing this must be specified in a way that can be interpreted automatically.

Table 1 shows a sample XML snippet illustrating the above starting point.

TABLE 1

- <start name="CentraSite 8.2.2 with Active SOA license">
 - <products>

TABLE 1-continued

```
    <product version="8.2.2"
       license="activesoa">CentraSite</product>
    </products>
 - <data-loads>
     <data-load>initial</data-load>
   </data-loads>
   <modifications/>
</start>
```

The XML snippet of Table 1 can be included in the XML source of the documentation, as the machine-executable steps which generated the documented screenshot.

Another documentation describing a GUI component of CentraSite might contain for example a screenshot based upon CentraSite 8.2.2 installed with Active SOA license combined with an installation of webMethod Mediator in a suitable version and both products being configured to be connected to each other. Table 2 below shows a sample XML snippet illustrating this starting point.

TABLE 2

```
- <start name="Cooperation of CentraSite Mediator Version 8">
 - <products>
     <product version="8.2.2"
     license="activesoa">CentraSite</product>
     <product version="8.4" license="community">Mediator</product>
   </products>
 - <data-loads>
     <data-load>initial</data-load>
   </data-loads>
 - <modifications>
     <modifications>connected</modification>
   <modifications/>
</start>
```

The XML snippet of Table 2 can be included in the XML source of the documentation, as the machine-executable steps which generated the documented screenshot.

Basic implementations interpreting such start specifications can, for example, map these settings to either the name of a virtual machine (VM) that provides the required basis or a VM's snapshot or the like.

The <preparation-steps> sub-element describes what has to be done to bring the system into the situation in which the screenshot can be produced.

Such steps in the preparation-steps may involve bringing the system into a specific state and/or load data. For CentraSite as probably for most software products the system conventionally provides a function for automatic execution of commands which may be loading of archives containing data and/or executing data manipulation steps (for example, macros or based on SQL or XQuery). Such functions are often conventionally established, for example for testing purposes or to be provided as upgrading automatisms for customers.

The <gui-steps> sub-element now describes step-by-step a sequence of steps to come to the desired screenshot. The steps are usually mouse clicks, possibly including small amounts of text. Mechanisms to describe GUI interactions suitable for this step are state of the art known techniques in many GUI testing tools, such as e.g. QTP (QuickTest Professional™, available from HP).

These descriptive elements which describe the sequence of steps can be manually inserted into the documentation. A preferred implementation, however, can include a logging component that monitors and logs the steps taken to produce the initial screenshot as it is first prepared for inclusion in the documentation. This can be achieved e.g. by instrumenting the GUI as is known to be documented accordingly so as to log keystrokes and mouse clicks. Then, the "take screen shot" functionality (or equivalent) can be modified to not just copy the bitmap of the screen (as is conventional), but also to copy the logged reproduction information; the "paste screenshot into documentation" functionality (or equivalent) adds both the bitmap and the reproduction information into the documentation.

The <gui-preparation> sub-element can describe whether the screenshot is taken as-is or as clippings and/or otherwise modified (enlarged, shrunk, rotated, etc.).

In order to revise a piece of documentation, an embodiment can, while revising a piece of documentation, proceed along the following steps for each screenshot, i.e. for each picture in the documentation that has an associated <production> element (as an example of the machine-executable steps which generated the documented screenshots):

1. The situation described in the <start> sub-element is established. This requires that all possible start states are available in an automatically producible form as VM, snapshot, etc.

2. The steps in the <preparation-steps> sub-element are automatically applied.

3. The steps in the <gui-steps> sub-element are executed and the screenshot taken.

4. The steps in the gui-preparation sub-element are performed so that the screenshot is modified as described in <gui-preparation>.

5. The resulting image, referred to as a "current screenshot", is bit-wise compared to the documented screenshot as contained in the documentation.

The mechanism can be parameterized with regard to what should happen in cases when the comparison shows differences between the image of the screen shot contained in the documentation and the result of steps 1-4. Possible options include replacing the original without any further activity, replacing and logging the replacement, not replacing and just logging the differences, and the like.

A more sophisticated implementation judges from the difference detected how big the impact of the change is and automatically replace screenshots with low impact (e.g. color changes only) and leave the heavily impacted cases to human decision. As the criteria depend on the GUI and product under consideration, this implementation allows for configuration based on various metrics for the difference of the two images under comparison, including e.g. "color change only", "shape change only", "no new GUI elements" etc. Low impact changes may be categorized as cosmetic only, to indicate that human review of the changes and a human decision is not needed.

An embodiment can provide for allowing to only log major changes (i.e., those which are not categories as cosmetic only). This embodiment can be used to easily detect places in the documentation that are impacted by visual changes to the underlying product which might be an indication of the need to also revise the corresponding textual description.

As a special case, one or more of the start, preparation steps and GUI steps does not lead to a screenshot at all, but fails somewhere on the way. In this case, the failure can be logged and a notification can be provided, for example that manual intervention of the documentation personnel is required.

Figure 3:
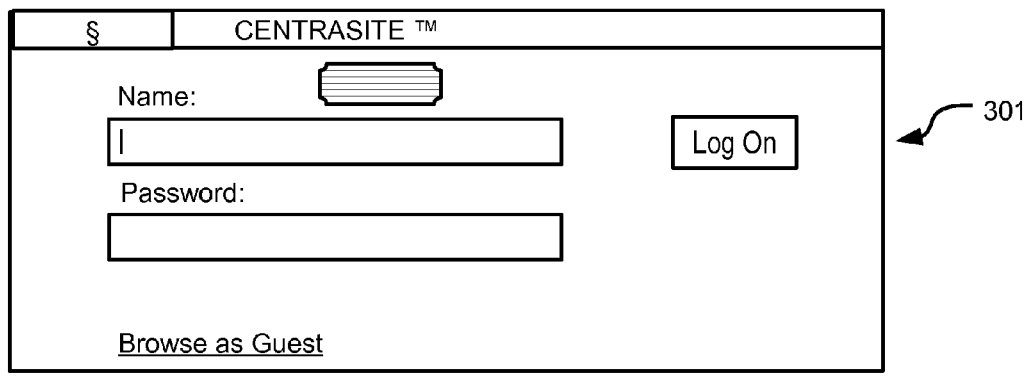
FIG. 3 is a first GUI screenshot.
Figure 4:
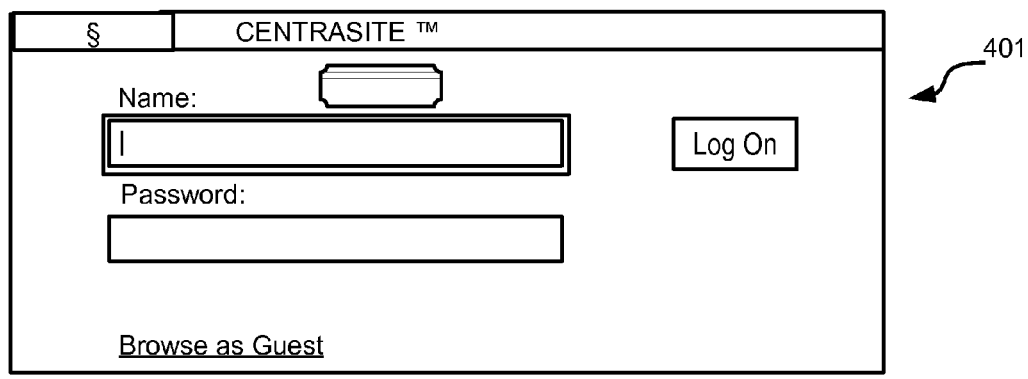
FIG. 4 is second GUI screenshot.
Figure 5:
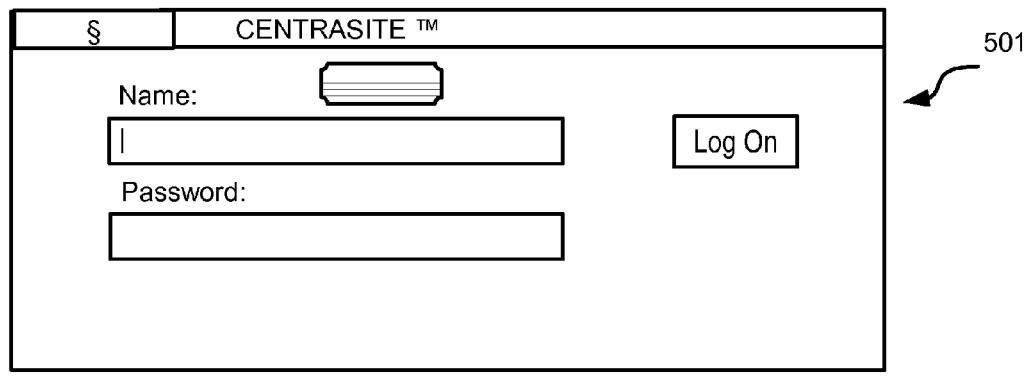
FIG. 5 is a third GUI screenshot.

FIG. 3, FIG. 4 and FIG. 5 are now referred to. FIG. 3 to FIG. 5 all illustrate GUI screenshots, and serve to illustrate how a small difference which occurred due to a system change may be overlooked by a person. In the field, document revisers have to busy themselves with the entire documentation or either risk not catching changes occurring in parts of the documentation considered not affected by the recent system enhancements. With respect to the screenshots in the documentation this means that either every single screenshot must be looked at and (at least mentally) compared to its actual counterpart or run the risk of showing outdated screenshots. In addition to this being a very time-consuming effort to take, humans can usually not be expected to be error-free in tasks where lots of similar looking occurrences of something must be scanned for possibly small flaws. Even the most thorough documenter will eventually overlook some issue in a screen which unfortunately may be important to a user. The three screenshots of FIG. 3, FIG. 4 and FIG. 5 illustrate the problem, all three showing a log-in screen for CentraSite Control version 8.2. It may be noted that a bitwise comparison between the screenshots in FIG. 3, FIG. 4 and FIG. 5, as proposed herein, would note that the screenshots are different.

Referring now to FIG. 3, a first GUI screenshot will be discussed and described. FIG. 3 illustrates the proper login screen.

Referring now to FIG. 4, a second GUI screenshot will be discussed and described. FIG. 4 uses some additional mechanism to highlight the field in which the user's first input is expected. Of course, the difference from FIG. 3 is apparent for anybody who has not seen this screenshot before and knows to look for a difference. It is not obvious for somebody who has looked at this very screenshot before (which has probably looked the same for a long time and was not very exciting in the first place), although the documentation may only show the first screenshot and the documenter is supposed to have the second one in mind. The fact that the documenter has the second screenshot in mind when looking at the first screenshot, however, is something that implies that the documenter had the chance and has taken the effort to click through the complete system to at least have a look at what the "new" screenshots look like. This again is a big effort and cannot always be expected.

Referring now to FIG. 5, a third GUI screenshot will be discussed and described. FIG. 5 also shows a slight deviation from the first screen of FIG. 3 which might get overlooked by human inspection. This time however, the difference signifies a larger change that must most likely be reflected by changes to the corresponding text; otherwise the paragraph describing the 'Browse as Guest' feature will seem unrelated.

Figure 6:
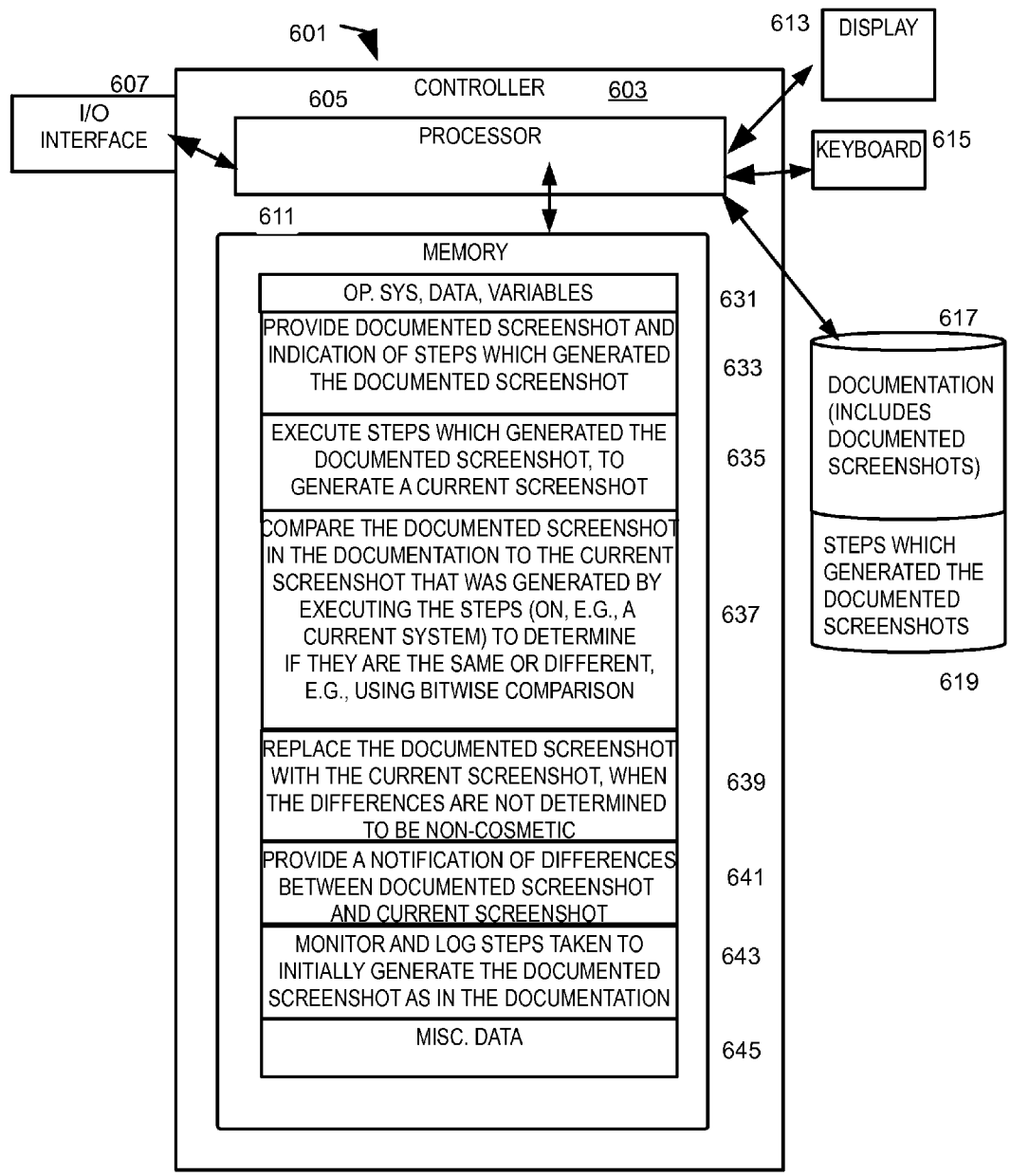
FIG. 6 is a block diagram illustrating relevant portions of a computer system.

Referring now to FIG. 6, a block diagram illustrating relevant portions of a computer system 601 will be discussed and described. The computer system 601 may include one or more controllers 603, a processor 605, an input/output (i/o) interface 607 for communication such as with a network (not illustrated), a memory 611, a display 613, and/or a user input device represented here by a keyboard 615. Alternatively, or in addition to the keyboard 615, a user input device may comprise one or more of various known input devices, such as a keypad or a pointing device such as a computer mouse, a touchpad, a touch screen, joy stick, a trackball, or the like. The display 613 may present information to the user by way of a conventional liquid crystal display (LCD) or other visual display, and/or by way of a conventional audible device (e.g., a speaker) for playing out audible messages. Portions of the computer system 601 are well understood to those of skill in this area and have been omitted to avoid obscuring the discussion.

The processor 605 may comprise one or more microprocessors and/or one or more digital signal processors. The memory 611 may be coupled to the processor 605 and may comprise a read-only memory (ROM), a random-access memory (RAM), a programmable ROM (PROM), and/or an electrically erasable read-only memory (EEPROM). The memory 611 may include multiple memory locations for storing, among other things, an operating system, data and variables 631 for programs executed by the processor 605; computer programs for causing the processor to operate in connection with various functions such as to provide 633 a documented screenshot and the associated steps which generated the documented screenshot; to execute 635 the steps which generated the documented screenshot, to generate a current screenshot; to compare 637 the documented screenshot in the documentation to the current screenshot; to replace 639 the documented screenshot with the current screenshot in certain situations; to provide 641 a notification of the differences; and to monitor 643 and log steps taken to initially generate the document screenshot. The computer programs may be stored, for example, in ROM or PROM and may direct the processor 605 in controlling the operation of the computer 601. Each of these functions is considered in more detail herein, to the extent that it is not detailed elsewhere in this document.

The user may invoke functions accessible through the user input device represented here by the keyboard 615; the keyboard 615 may be supplemented or replaced with a scanner, card reader, or other data input device. Responsive to manual signaling from the user input device represented by the keyboard 615, in accordance with instructions stored in memory 611, and/or automatically upon receipt of certain information via the i/o interface 607, the processor 605 may direct the execution of the stored programs.

The processor 605 may be programmed to provide 633 a documented screenshot and the associated steps which generated the documented screenshot. The documented screenshot can be included in documentation, which is stored in an electronic storage of the documentation 617. As discussed above, the documentation can be stored in documentation electronic storage 617 which includes the documented screen shots that appear in the documentation when it is created. It will be understood that the documentation in the electronic storage 617 can include the representation in the document creation language, and optionally the documentation created by the document creation language in a format which is appropriate for reader to view. The documentation in the electronic storage 617 can include, individually for a documented screenshot, the machine-executable steps 619 which generated the documented screenshot. The machine-executable steps, or a reference thereto, can be included in association with the documented screenshot in the document creation language for the documentation The processor 605 may be programmed to execute 635 the steps which generated the documented screenshot, to generate a current screenshot. For example, when the document creation language for the documentation 617 is executed in its usual order, the document creation language can execute the machine-executable steps 619 which generated the documented screenshot, to create a current screenshot.

The processor 605 may be programmed to compare 637 the documented screenshot in the documentation to the current screenshot that was generated by executing the steps (for example, on a current system) to determine if they are the same or different, for example, using a bitwise comparison. That is, once the current screenshot is created, the documented screenshot can be retrieved from the documentation electronic storage 617 and compared to the current screenshot. Techniques are known for providing a comparison of each bit in stored images, such as the mentioned bitwise comparison or commercially available image file comparison products, such as PDF comparison products. The comparison can determine whether or not the documented and current screenshots are identical.

The processor 605 may be programmed to replace 639 the documented screenshot with the current screenshot in certain situations, such as when the differences are not determined to be non-cosmetic. This can result in automatically replacing documented screenshots in the documentation with the current screenshot, for example, when the change is listed in a category as a mere cosmetic change. Such mere cosmetic changes can be pre-determined as, for example, one or more of a color change, a size change, a trademark replacement, a version number replacement, or other. The comparison may be implemented to determine whether the difference between the documented and current screenshot is a change which is pre-determined to be one or more of the cosmetic changes. Conventional techniques may be used to delete the documented screenshot from the documentation and to insert the current screenshot in the place of the documented screenshot.

The processor 605 may be programmed to provide 641 a notification of the differences. For example, the differences can be stored into a log file, or can be displayed to an operator, such as with an indication of the differences and/or with a copy of one or both of the documented and current screenshots, optionally with an indication of documented screenshots which were compared and which were determined to have no differences. Furthermore, a prompt can be generated to request operator intervention, optionally to display an indication of the differences and/or a copy of the documented and current screenshots, and prompting the operator to indicate whether or not to accept the current screenshot (which can then be used to replace the documented screenshot as described herein).

The processor 605 may be programmed to monitor 643 and log steps taken to initially generate the document screenshot. This has been discussed in more detail elsewhere herein. Generally, the processor 605 can be placed into a state to log keystrokes and operator actions, e.g., using known techniques. Then, the command to capture the screenshot for the documentation not only prepares a screenshot, but also stores the data from the log of keystrokes and operator actions, and continues logging while the screenshot is edited/manipulated (if at all), until the screenshot is stored as a documented screenshot into the documentation. Furthermore, the monitor 643 and log can retrieve the system information, and the active program and details, and can include that information in the stored data. The stored data can be placed into the appropriate format of the machine-executable indication of the steps, and stored in connection with the document creation language which is used to create the documentation.

As will be understood in this field, besides the functions discussed above, the memory 611 can include locations for other miscellaneous data 645 along with the usual temporary storage and other instructions for other programs not considered herein.

The computer system 601 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 605, memory 611, a disk drive and/or removable storage medium are referred to as "computer-readable storage media" and provide non-transitory storage of computer programs and data.

It should be understood that FIG. 6 is described in connection with logical groupings of functions or resources. One or more of these logical groupings may be performed by different components from one or more embodiments. For example, it is possible to omit the function to monitor 643 and log steps taken to initially generate the document screenshots; it is not necessary for this function to reside on the same computer as the computer which has the function to computer 637 the document screenshot to the current screenshot. As another example, it is possible to omit the function of replacing 639 the documented screenshot with the current screenshot, such as when the user merely wants a notification of the screenshots which are different. As a further example, the display 613 and keyboard 615 can be omitted from a computer system 601 which is performing an automated determination without human interaction. Similarly, the I/O interface 607 can be omitted. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 7:
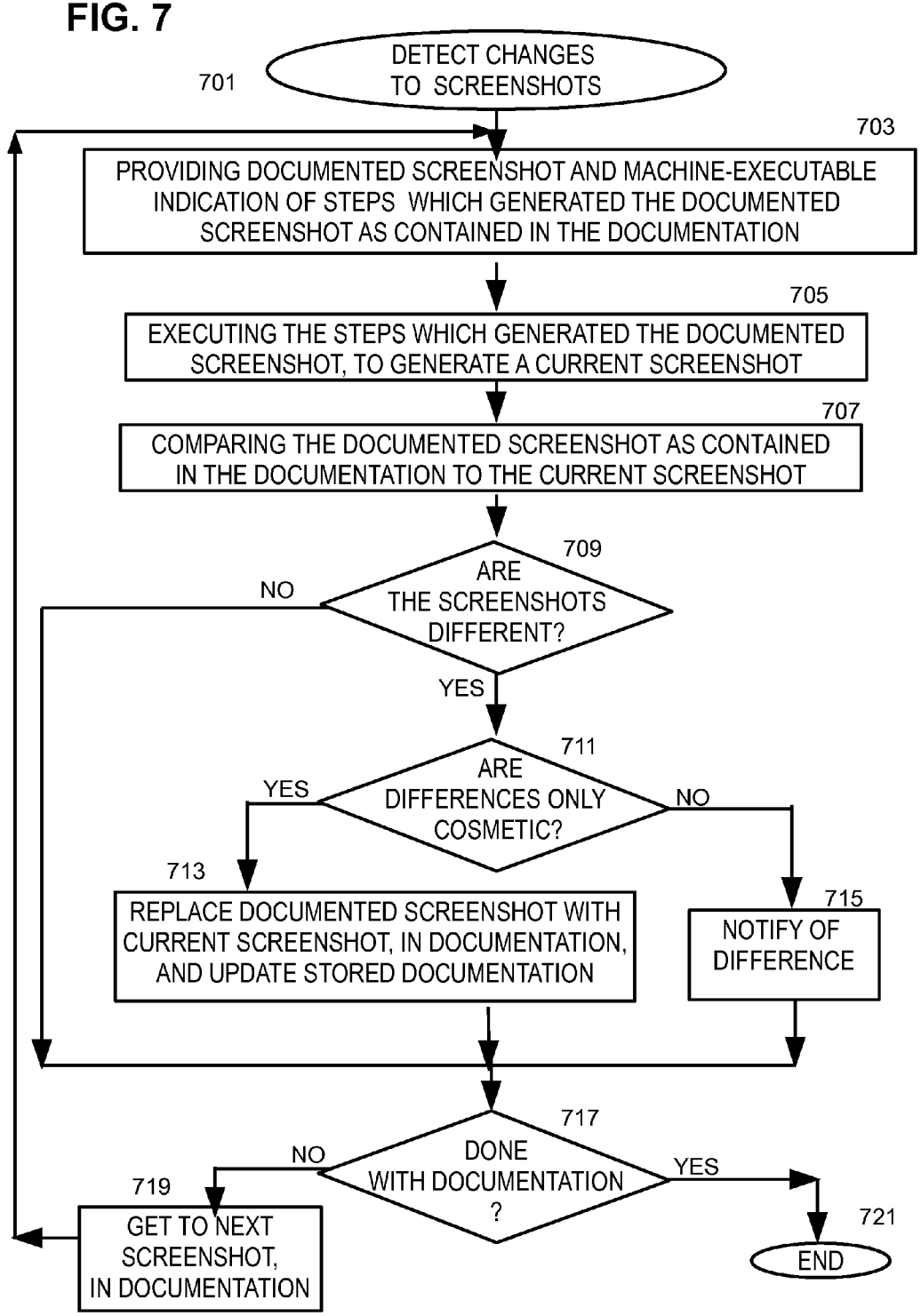
FIG. 7 is a flow chart illustrating a procedure to detect changes to screenshots.

Referring now to FIG. 7, a flow chart illustrating a procedure 701 to detect changes to screenshot will be discussed and described. The procedure 701 can advantageously be implemented on, for example, a processor of a controller, described in connection with FIG. 6, or other apparatus appropriately arranged.

In overview, the procedure 701 to detect changes to screenshots includes providing 703 a documented screenshot and a machine-executable indication of steps which generated the documented screenshot; executing 705 the steps which generated the documented screenshot, to generate a current screenshot; comparing 707 the documented and current screenshots; if 709 they are different, and if 711 the differences are only cosmetic, then replacing 713 the documented screenshot with the current screenshot; and if 711 the differences are not only cosmetic, then providing 715 a notification of the differences; then, if the procedure 701 is not done 717 with the documentation, the procedure 701 gets 719 to the next screenshot in the documentation, and repeats the steps; then, the procedure ends 721. These steps are now explained in a little more detail, although much of the details related to these steps is already described above.

The procedure 701 includes providing 703 a documented screenshot and a machine-executable indication of steps which generated the documented screenshot. The procedure 701 can be initiated in a variety of ways. For example, it can be initiated by a request to generate the documentation from the document creation language for the documentation, in which case the entire document creation language for the documentation is executed. Or, it can be initiated by an execution of a portion of the document creation language, in which case the relevant portion of the document creation language is executed. Or, a request can be generated to check/update only the screenshots of the documentation, or only one or more of the screenshots, in which case the document creation language which is not related to detecting the changes in the requested screenshots can be skipped. In any event, it may be convenient to provide, to the procedure 701, the document creation language corresponding to the documentation, which has both the documented screenshot and the machine-executable indication of the steps which generated the documented screenshot as contained in the documentation.

The procedure 701 includes executing 705 the machine-executable steps which generated the documented screenshot, to generate a current screenshot. Such steps may include the starting specifications that indicate a machine (virtual or otherwise), a product and a product version, and any data that is to be loaded. The procedure 701 can cause the system to conform to the starting specifications and can check whether the system matches the starting specifications. Note, if the documentation includes multiple screenshots, it may be more convenient to check whether the system already matches the starting specifications, before causing the system to conform to the starting specifications. The steps may also include preparation steps which are applied to place the system in which the processor is running into a situation in which the screenshot is producible. This can include preparatory steps such as to run the application which presents the GUI of interest. The steps may also include GUI steps that indicate GUI interactions that produce an image on a display which will correspond to the documented screenshot, after the system is placed into the situation by the preparation steps. The steps also may include GUI preparation steps, which are executed subsequent to the image having been produced by the GUI steps; the GUI preparation steps take and produce the current screenshot, which is appropriate for insertion into the documentation, from the image on the display after being produced by the GUI steps. Conventional techniques and commands are known for capturing a screenshot from an image on a display. The GUI preparation steps are those which were used initially to produce the documented screenshot, and include for example edits and manipulations to the screenshot which was captured from the image on the display. The current screenshot which has thus been developed should be identical to the documented screenshot if nothing that affects the screenshot has changed.

The procedure 701 includes comparing 707 the documented screenshot, as contained in the documentation, and the current screenshot. Techniques have been discussed which may be used to perform the comparison.

The procedure 701 illustrated in FIG. 7 takes additional steps after the comparison 707. An embodiment can omit some or all of the additional steps after the comparison, for example, and instead merely note whether or not the screenshots are different. However, in the illustrated embodiment, if 709 the documented and current screenshots are different, and if 711 the differences are only cosmetic, then the procedure 701 includes replacing 713 the documented screenshot in the documentation with the current screenshot and updating the stored documentation with the current screenshot (optionally including generating new reader-viewable format documentation). Techniques are discussed elsewhere for determining whether the differences are only cosmetic, and for replacing the documented screenshot in the documentation. On the other hand, in the embodiment of FIG. 7, if 711 the differences are not only cosmetic, then the procedure 701 can provide 715 a notification of the differences, thereby allowing a human to determine whether or not to replace the documented screenshot in the documentation with the updated screenshot, and/or whether or not the related text in the documentation requires updating.

Then, the procedure 701 can determine if it is done with the documentation (or portion of documentation selected for checking). If the procedure 701 is not done 717 with the documentation, the procedure 701 gets 719 to the next screenshot in the documentation, and repeats the steps. On the other hand, if the procedure is done with the documentation (or portion of documentation selected for checking), then the procedure ends 721.

Figure 8:
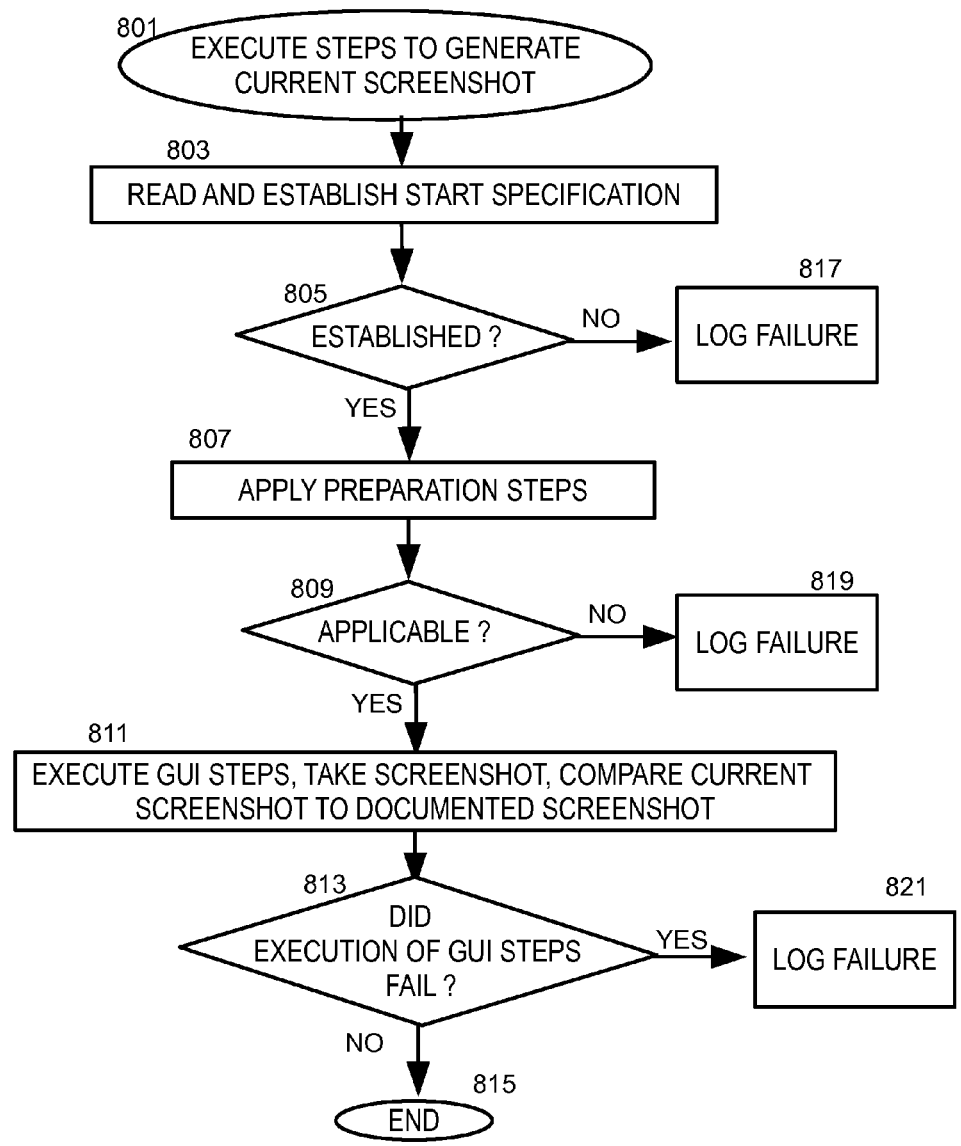
FIG. 8 is a flow chart illustrating a procedure to execute steps to generate a current screenshot and compare it to a documented screenshot.

Referring now to FIG. 8, a flow chart illustrating a procedure 801 to execute steps to generate a current screenshot and compare it to a documented screenshot will be discussed and described. FIG. 8 corresponds to references 705 and 707 of FIG. 7. The procedure 801 can advantageously be implemented on, for example, a processor of a controller, described in connection with FIG. 6, or other apparatus appropriately arranged. In fact, the complete proceedings for a simple embodiment can be summarized in FIG. 8, in which the procedure 801 logs all failures regardless of where they happen during the process, and does not yet distinguish between slight and heavy deviations when comparing the screenshots.

In overview, a procedure 801 to execute steps to generate a current screenshot includes to read 803 and establish a start specification; if 805 the start specification is not successfully established, then a failure 817 is logged; otherwise, the procedure 801 will apply 807 the preparation steps; if 809 the preparation steps are not successfully applied, then a failure 819 is logged; otherwise, the procedure 801 will execute 811 the GUI steps, take the screenshot, and compare the current screenshot to the documented screenshot; then, if execution of the GUI steps failed, a failure 821 is logged; otherwise the procedure ends 815. These are reviewed in a little more detail below.

The procedure 801 can read 803 and establish a start specification which is associated with a documented screenshot, as described previously using the machine-executable steps which can be provided in the document creation language version of the documentation. The start specification specifies the machine, product, product version, and any data.

If 805 the start specification is not successfully established, then the procedure 801 can log 817 a failure.

If 805, however, the start specification is successfully established, then the procedure 801 will apply 807 the preparation steps of the machine-executable steps (e.g., in the document creation language version of the documentation) to place the system into a situation in which the screenshot is producible.

If 809 the preparation steps are not successfully applied, then the procedure 801 can log 819 a failure.

If 809, however, the preparation steps are successfully applied, then the procedure 801 will execute 811 the GUI steps and take the screenshot as specified in the machine-executable steps (e.g., in the document creation language version of the documentation) to generate the current screenshot; and the procedure 801 can compare the current screenshot to the documented screenshot. As discussed above, a bitwise comparison can be simple but effective; other embodiments may use other techniques for comparison.

If the execution 813 of the GUI steps failed, then a failure 821 is logged. It is possible for the GUI steps to fail, for example when the user interface has been revised, different menus are presented, different user responses are accepted by the GUI, and the like.

Then, if there were no failures, the procedure 801 can end 815. Optionally, an indication can be provided to affirmatively confirm that the documented and currently screenshots were not different.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may sometimes contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

Terms as used herein are intended to be interpreted as understood to one of skill in the all of the arts of graphical user interfaces, computer images, and technical documentation, instead of as interpreted by a more general dictionary.

Furthermore, the networks of interest for communicating between computers onto which some embodiments may be distributed include those that transmit information in packets, for example, those known as packet switching networks that transmit data in the form of packets. Such networks can provide wireless communications capability and/or utilize wireline connections such as cable and/or a connector, or similar.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
a processor, the processor is configured to:
responsive to a command to initially generate a documented screenshot as contained in documentation, store, in association with the documented screenshot, a machine- executable indication of steps as the steps are taken that generate the documented screenshot in association with the documented screenshot,
wherein the machine-executable indication of steps, when executed, bring a specific machine into a specific state during which a screenshot is produced,
wherein the machine-executable indication of steps specifies at least:
(i) starting specifications of a machine and canonical product installed on the machine; (ii) preparation steps then applied to place the machine into the specific state that the documented screenshot is produced; (iii) graphical used interface (GUI) interactions then applied that produce a current image on a display of the machine; and (iv) GUI preparation steps then applied to produce said documented screenshot;
wherein the machine-executable steps are executed in this order, and the machine-executable steps change the processor on the specific machine into an actual state which is the same as the specific state during which the documented screenshot is produced, the current image produced in the actual state can differ from the screenshot previously produced at the specific state;
provide the documented screenshot and the associated machine-executable indication of the steps which generated the documented screenshot as contained in documentation;
execute, in this order, the machine-executable indication of steps which includes the starting specifications, the preparation steps, the GUI interactions, and the GUI preparation steps, which previously generated the associated documented screenshot, to generate a current screenshot; and
compare the documented screenshot as contained in the documentation which was previously generated to the current screenshot which was generated by executing the steps, to provide a determination whether the comparison shows differences between the documented screenshot and the current screenshot.

2. The computer system of claim 1, wherein the documented screenshot and the current screenshot are compared using a bit-wise comparison of their images, and the comparison is determined to show differences when there are bit-wise differences in the images of the document screenshot and the current screenshot.

3. The computer system of claim 1, wherein the processor is further configured to
determine whether the differences between the documented screenshot and the current screenshot are non-cosmetic, when the determination is that there are differences between the documented screenshot and the current screenshot, and
replace the documented screenshot as contained in the documentation with the current screenshot, when the differences are determined not to be non-cosmetic.

4. The computer system of claim 1, wherein the processor is further configured to provide a notification, when the determination is that there are differences between the documented screenshot and the current screenshot.

5. The computer system of claim 1, wherein the processor is further configured to monitor and log the steps as they are taken, responsive to a command to initially generate the documented screenshot as contained in the documentation.

6. The computer system of claim 1, further comprising:
an electronic storage cooperatively operable with the processor, and configured to store the documentation accompanied by the machine-executable indication of the steps which generated the documented screenshot as contained in the documentation.

7. A method to detect changes to a screenshot used in documentation, comprising:
responsive to a command to initially generate a documented screenshot as contained in documentation, storing, by a computer processor, in association with the documented screenshot, a machine-executable indication of steps as the steps are taken that generate the documented screenshot in association with the documented screenshot,
wherein the machine-executable indication of steps, when executed, bring a specific machine into a specific state during which a screenshot is produced,
wherein the machine-executable indication of steps specifies at least:
(i) starting specifications of a machine and canonical product installed on the machine; (ii) preparation steps then applied to place the machine into the specific state that the documented screenshot is produced; (iii) graphical user interface (GUI) interactions then applied that produce a current image on a display of the machine; and (iv) GUI preparation steps then applied to produce said documented screenshot;
wherein the machine-executable steps are executed in this order, and the machine-executable steps change the processor on the specific machine into an actual state which is the same as the specific state during which the documented screenshot is produced, the current image produced in the actual state can differ from the screenshot previously produced at the specific state;
providing, by the computer processor, the documented screenshot and the associated machine-executable indication of the steps which generated the documented screenshot as contained in documentation;
executing, by the computer processor, in this order, the machine-executable indication of steps which includes the starting specifications, the preparation steps, the GUI interactions, and the GUI preparation steps, which previously generated the associated documented screenshot, to generate a current screenshot; and comparing, by the computer processor, the documented screenshot as contained in the documentation which was previously generated to the current screenshot which was generated by executing the steps, and providing a determination whether the comparion shows differences between the documented screenshot and the current screenshot.

8. The method of claim 7, wherein the documented screenshot and the current screenshot are compared using a bit-wise comparison of their images, and the comparison is determined to show differences when there are bit-wise differences in the images of the document screenshot and the current screenshot.

9. The method of claim 7, further comprising:

determining, by the computer processor, whether the differences between the documented screenshot and the current screenshot are non-cosmetic, when the determination is that there are differences between the documented screenshot and the current screenshot, and replacing, by the computer processor, the documented screenshot as contained in the documentation with the current screenshot, when the differences are determined not to be non-cosmetic.

10. The method of claim 7, further comprising:

providing, by the computer processor, a notification, when the determination is that there are differences between the documented screenshot and the current screenshot.

11. The method of claim 7, further comprising:

monitoring and logging, by the computer processor, the steps as they are taken, responsive to a command to initially generate the documented screenshot as contained in the documentation.

12. The method of claim 7, further comprising:

storing, in an electronic storage, the documentation accompanied by the machine-executable indication of the steps which generated the documented screenshot as contained in the documentation.

13. A non-transitory computer readable medium comprising executable instructions for performing a method to detect changes to a screenshot used in documentation, comprising computer-executable instructions for:

responsive to a command to initially generate a documented screenshot as contained in documentation, storing, in association with the documented screenshot, a machine-executable indication of steps as the steps are taken that generate the documented screenshot in association with the documented screenshot, wherein the machine-executable indication of steps, when executed, bring a specific machine into a specific state during which a screenshot is produced, wherein the machine-executable indication of steps specifies at least:

(i) starting specifications of a machine and canonical product installed on the machine; (ii) preparation steps then applied to place the machine into the specific state that the documented screenshot is produced; (iii) graphical user interface (GUI) interactions then applied that produce a current image on a display of the machine; and (iv) GUI preparation steps then applied to produce said documented screenshot;

wherein the machine-executable steps are executed in this order, and the machine-executable steps change the processor on the specific machine into an actual state which is the same as the specific state during which the documented screenshot is produced, the current image produced in the actual state can differ from the screenshot previously produced at the specific state;

providing the documented screenshot and the associated machine-executable indication of the steps which generated the documented screenshot as contained in documentation;

executing, in this order, the machine-executable indication of steps which includes the starting specifications, the preparation steps, the GUI interactions, and the GUI preparation steps, which previously generated the associated documented screenshot, to generate a current screenshot; and comparing the documented screenshot as contained in the documentation which was previously generated to the current screenshot which was generated by executing the steps, and providing a determination whether the comparison shows differences between the documented screenshot and the current screenshot.

14. The non-transitory computer readable medium of claim 13, wherein the documented screenshot and the current screenshot are compared using a bit-wise comparison of their images, and the comparison is determined to show differences when there are bit-wise differences in the images of the document screenshot and the current screenshot.

15. The non-transitory computer readable medium of claim 13, further comprising:

determining whether the differences between the documented screenshot and the current screenshot are non-cosmetic, when the determination is that there are differences between the documented screenshot and the current screenshot, and replacing the documented screenshot as contained in the documentation with the current screenshot, when the differences are determined not to be non-cosmetic.

16. The non-transitory computer readable medium of claim 13, further comprising:

providing a notification, when the determination is that there are differences between the documented screenshot and the current screenshot.

17. The non-transitory computer readable medium of claim 13, further comprising:

monitoring and logging the machine-executable indication of the steps as they are taken, responsive to a command to initially generate the documented screenshot as contained in the documentation; and storing, in an electronic storage, the documentation accompanied by the machine-executable indication of the steps which generated the documented screenshot as contained in the documentation.

* * * * *